(12) United States Patent
Falcoz et al.

(10) Patent No.: US 8,462,431 B2
(45) Date of Patent: Jun. 11, 2013

(54) METHOD AND DEVICE FOR SPECTRAL CONTROL IN FREQUENCY CONVERSION LASER AMPLIFIERS

(75) Inventors: Franck Falcoz, Dourdan (FR); Emmanuel Marquis, Bullion (FR)

(73) Assignee: Thales, Neuilly sur Seine (FR)

( * ) Notice: Subject to any disclaimer, the term of this patent is extended or adjusted under 35 U.S.C. 154(b) by 882 days.

(21) Appl. No.: 12/373,049

(22) PCT Filed: Jul. 11, 2007

(86) PCT No.: PCT/EP2007/057127
§ 371 (c)(1),
(2), (4) Date: Oct. 13, 2009

(87) PCT Pub. No.: WO2008/006862
PCT Pub. Date: Jan. 17, 2008

(65) Prior Publication Data
US 2011/0194173 A1    Aug. 11, 2011

(30) Foreign Application Priority Data
Jul. 11, 2006    (FR) ..................................... 06 06305

(51) Int. Cl.
*H01S 3/042*    (2006.01)
*H01S 3/131*    (2006.01)
*H01S 3/23*    (2006.01)
*H01S 3/137*    (2006.01)
*H01S 3/16*    (2006.01)

(52) U.S. Cl.
CPC ............. *H01S 3/1317* (2013.01); *H01S 3/2308* (2013.01); *H01S 3/042* (2013.01); *H01S 3/1636* (2013.01); *H01S 3/1625* (2013.01); *H01S 3/137* (2013.01)
USPC ...................................................... 359/346

(58) Field of Classification Search
CPC ....... H01S 3/2308; H01S 3/1317; H01S 3/042; H01S 3/137
USPC .......................................................... 359/346
See application file for complete search history.

(56) References Cited

U.S. PATENT DOCUMENTS
3,229,222 A * 1/1966 Sorokin et al. .................. 372/70
5,126,876 A * 6/1992 O'Meara ........................ 359/338
(Continued)

FOREIGN PATENT DOCUMENTS
WO        0001101 A1    1/2000

OTHER PUBLICATIONS

Zhiyi Wei et al: "Optimized Design and Construction of 100TW TI: Sapphire Laser—Toward to Phase Controlling, Spectrum Shaping and Wave-Front Correction"; Leos, 2005 IEEE Annual Meeting Conference Proceedings Sydney, Australia Oct. 23-27, 2005, Piscataway, NJ, USA, IEEE, (Oct. 23, 2005), pp. 619-620, XP010886708; ISBN: 0-7803-9217-5.

(Continued)

*Primary Examiner* — Mark Hellner
*Assistant Examiner* — Ari M Diacou
(74) *Attorney, Agent, or Firm* — Lowe Hauptman Ham & Berner, LLP

(57)    ABSTRACT

The invention relates to a method of spectral control in a frequency-shift laser chain for producing ultra-short pulses and comprising at least two laser-crystal amplifier stages, for cooling the crystal of one of the amplifier stages of the chain.

11 Claims, 8 Drawing Sheets

U.S. PATENT DOCUMENTS

| | | | |
|---|---|---|---|
| 5,144,629 A | 9/1992 | Basu | |
| 5,181,212 A * | 1/1993 | Moberg | 372/22 |
| 5,862,845 A * | 1/1999 | Chin et al. | 144/329 |
| 6,150,630 A | 11/2000 | Perry et al. | 219/121.68 |
| 6,330,259 B1 * | 12/2001 | Dahm | 372/35 |
| 6,724,782 B2 * | 4/2004 | Hartemann et al. | 372/5 |
| 6,751,240 B2 * | 6/2004 | Arisawa et al. | 372/3 |
| 7,349,452 B2 * | 3/2008 | Brennan et al. | 372/25 |
| 8,050,302 B2 * | 11/2011 | Furuya et al. | 372/34 |
| 2003/0053776 A1 * | 3/2003 | Dejneka et al. | 385/123 |
| 2004/0151217 A1 * | 8/2004 | Yeik | 372/25 |
| 2004/0233944 A1 * | 11/2004 | Dantus et al. | 372/25 |
| 2005/0041702 A1 * | 2/2005 | Fermann et al. | 372/25 |
| 2005/0111500 A1 * | 5/2005 | Harter et al. | 372/25 |
| 2005/0225846 A1 * | 10/2005 | Nati et al. | 359/341.1 |
| 2005/0265407 A1 | 12/2005 | Braun et al. | |
| 2007/0229939 A1 * | 10/2007 | Brown et al. | 359/341.1 |
| 2008/0013163 A1 * | 1/2008 | Leonardo et al. | 359/341.31 |
| 2008/0031294 A1 * | 2/2008 | Krishnamoorthy et al. | 372/34 |
| 2008/0089369 A1 * | 4/2008 | Luo et al. | 372/28 |
| 2009/0244695 A1 * | 10/2009 | Marcinkevicius et al. | 359/340 |
| 2009/0274181 A1 * | 11/2009 | Akahane et al. | 372/25 |
| 2010/0061411 A1 * | 3/2010 | Chang et al. | 372/25 |

OTHER PUBLICATIONS

Oishi Yu et al: "SUB-10 FS, Multimillijoule Laser System"; Review of Scientific Instruments, American Institute of Physics, US, vol. 76, No. 9, (Sep. 16, 2005), p. 93114-93114, XP012079698; ISSN: 0034-6748.

Planchon T A et al: "Adaptive Wavefront Correction on a 100-TW/10-HZ Chirped Pulse Amplification Laser and Effect of Residual Wavefront on Beam Propagation"; Optics Communications, North-Holland Publishing Co. Amsterdam, NL, Vol. 252, No. 4-6, (Aug. 15, 2005), p. 222-228, XP004983380; ISSN: 0030-4018.

* cited by examiner

METHOD AND DEVICE FOR SPECTRAL CONTROL IN FREQUENCY CONVERSION LASER AMPLIFIERS

CROSS-REFERENCE TO RELATED APPLICATIONS

The present application is based on International Application No. PCT/EP2007/057127, filed on Jul. 11, 2007, which in turn corresponds to French Application No. 06/06305 filed on Jul. 11, 2006, and priority is hereby claimed under 35 USC §119 based on these applications. Each of these applications are hereby incorporated by reference in their entirety into the present application.

FIELD OF THE INVENTION

The present invention pertains to a method and to a device for spectral control in so-called CPA (Chirped Pulse Amplification) frequency-drift laser chains.

BACKGROUND OF THE INVENTION

The rise in energy of frequency-drift lasers, of titanium-doped sapphire type, is leading to the appearance of problems regarding control of the spectrum, and therefore pulse duration, in high-energy amplifiers.

Indeed, in this type of amplifier, the signal level is for example close to saturation, thus giving rise to deformations of the amplified spectrum, and therefore limiting the performance in terms of pulse duration.

A conventional solution consists in pre-compensating, at the start of the chain, for the spectral deformation. This filtering-based solution is naturally penalizing in terms of efficiency, since it acts by filtering, and therefore causes energy losses.

Frequency-drift technology is based on the use of a wide spectrum, pulse stretching, amplification and re-compression.

Typically, Ti:Sa chains have an oscillator spectrum of from 5 to 100 nm, for compressed pulse durations of from 150 to 10 fs approximately. The ability of the amplification chain to maintain a correct spectrum directly influences the ability of the laser to work with short pulses.

The spectral constriction induced by the amplifiers is therefore a key factor for obtaining short-duration performance. Likewise, a large deformation of the spectrum, for example asymmetric, disturbs the temporal shape and impairs the operation of the laser.

The amplifiers used are of the type with n passes (2 to 4 conventionally, but configurations with more passes exist) of the beam through the crystal, the amplifying medium.

The pump laser dispatches a pulse into the crystal and the beam to be amplified is thereafter dispatched and performs n passes so as to optimize the extraction in terms of energy.

FIG. 1 diagrammatically depicts a multi-pass amplifier of this kind, which essentially comprises a crystal CR (for example Ti:Sa) receiving, from an input mirror ME, input pulses at an angle differing from the normal to its incidence surface, and several reflecting mirrors M1 to M7 disposed on either side of the crystal 1 so as to cause the beam to pass through the crystal at various angles of incidence, the last mirror M7 reflecting this beam to the output via an output mirror MS.

The gain of the amplifier may be written:

$$E_{OUT} = J_{SAT} \cdot S \cdot \ln\left(\frac{J_{STO}}{J_{SAT}}\left(e^{\frac{E_{in}}{S J_{SAT}}} - 1\right) + 1\right)$$

$J_{STO}$ being the stored fluence available for the gain in the medium, $J_{SAT}$ the saturation fluence of this medium and S the pumped laser crystal surface area. This is the classical equation from the theory of Frantz and Nodvick.

The table below contains a few examples of values of $J_{SAT}$ for various laser materials:

| Materials | $J_{sat}$ in J/cm² | Spectral range |
| --- | --- | --- |
| Dyes | ~0.001 J/cm² | Visible |
| Excimers | ~0.001 J/cm² | UV |
| Nd:YAG | 0.5 J/cm² | 1064 nm |
| Ti:Al$_2$O$_3$ | 1.1 J/cm² | 800 nm |
| Nd:Glass | 5 J/cm² | 1054 nm |
| Alexandrite | 22 J/cm² | 750 nm |
| Cr:LiSAF | 5 J/cm² | 830 nm |

In the small-signal regime, with $J_{IN} \ll J_{SAT}$, the gain relation can be approximated with:

$$G = \frac{E_{OUT}}{E_{IN}} = e^{\left(\frac{J_{STO}}{J_{SAT}}\right)}$$

The shape of the gain curve of the above-described amplifiers being close to a Gaussian, at each pass through the medium, a constriction of the spectrum due simply to the gain is observed.

The curve of FIG. 2 shows a typical exemplary gain in a Ti:Sa crystal as a function of wavelength, this curve being centered on the wavelength of 800 nm.

As a result of the amplification in this medium, a gain which is non-uniform as a function of wavelength will be applied to an input signal of limited spectrum, the effect of which is to cause an alteration: spectral constriction. The example of FIG. 3 illustrates this effect, which is accentuated with the number of passes through the amplifier. The curve of the input signal as a function of its wavelength and the curves of the signal after 1, 4 and 8 passes through the crystal, respectively, have been represented in this FIG. 3.

The graph of FIG. 4 shows the deviation between the single-pass gain and the gain in four passes and reveals the spectrum constriction effect.

It will be noted that when the input signal possesses a spectrum that is non-centered with respect to the maximum of gain of the medium, the spectral constriction is accompanied by a shift effect which tends to return the signal to the maximum gain spike. The graph of FIG. 5 shows a signal centered at 750 nm shifted progressively towards 800 nm during the multi-pass amplification (for 1, 4 and 8 passes, respectively).

To compensate for this effect, a pre-distortion is usable by active or passive filtering at the price of a decrease in the efficiency of the laser. Specifically, the filters used have efficiencies of the order of 50% since they act (cut off) spectrally at the energy maximum.

The amplified pulse being stretched (dispersed), usually positively, the Applicant has highlighted the following problem, described below with reference to FIGS. 6 to 12.

Specifically, chains based on short pulses use a wide-spectrum oscillator and these short pulses are stretched temporally and are thereafter amplified and re-compressed at the output. Such a chain is schematically represented in FIG. 6, this chain essentially comprising an oscillator 1, a stretcher 2, one or more amplification stages 3 and a compression device 4. An exemplary spectrum of a Ti:Sa oscillator signal has been represented in FIG. 7. In this FIG. 7, the spectral phase has been represented as a continuous line.

When the pulse penetrates an amplifier 5, the initial spectral components see a gain g1 and are amplified. The following components being in the amplifier therefore see a gain g2 which has decreased because the start of the pulse has "consumed" stored energy. This temporal action of the gain is shown diagrammatically in FIG. 8.

There is an initial gain for the first temporal part of the form:

$$gi = \frac{j_{STO}}{j_{SAT}}$$

and a final gain, which takes account of the extracted energy, of the form:

$$gf = \frac{j_{STI} - J_{ex}}{j_{SAT}}$$

$J_{ex}$ being the amplifier extracted fluence.

The apparent gain is therefore higher for the temporal start of the signal than for the end, thereby inducing a spectral deformation of the amplified signal.

The curve of FIG. 9 shows the effect of modifying the gain of a laser crystal due to the temporal stretching of the pulses to be amplified. This curve gives the value of the relative gain (in arbitrary units, as is the case for all the other gain curves) as a function of the wavelength of the amplified signal.

FIG. 10 shows two curves of the shift of the gain due to temporal stretching as a function of wavelength, respectively for one pass and for four passes through the crystal.

In addition to the constriction due to the gain, a shift of the spectrum towards the wavelengths extracted first (here, the highest) is observed, as represented in FIG. 11.

It will be noted moreover that, when the input signal is off-centered with respect to the gain of the laser medium, the shift effect is accentuated. Thus, for example, as represented in FIG. 12, the input signal is centered at 760 nm, although after 24 passes through the laser medium, the final signal is centered at 820 nm, the shift increasing in tandem with the successive passes through the laser medium.

The combination of these two effects therefore greatly limits the performance of frequency-drift chains since it limits the re-compression of the incident pulses with a view to obtaining at the output pulses of very short durations.

SUMMARY OF THE INVENTION

The subject of the present invention is a method making it possible to optimize the operation of CPA laser chains, practically without loss of energy and without altering the spectrum of the pulses produced, in particular in the case of ultrashort pulses (with a duration of the order of a few fs). The subject of the present invention is also a device for implementing this method.

The method in accordance with the invention applies to a frequency-drift (CPA) laser chain for producing pulses and comprising at least two laser-crystal amplifier stages, and it is characterized in that it consists in cooling the laser crystal of one at least of the stages of one of the amplifier stages of the chain.

The device for implementing the method of the invention comprises a cooling device associated with the crystal of one at least of the amplifier stages of the CPA chain. Preferably, this stage is the first of the chain. Preferably also, the cooling is operated at a temperature of about 20 to 150 K.

Thus, the invention consists in controlling, via the temperature of the medium, the spectral position of the gain of an amplifier, thereby making it possible in a chain composed of several stages to effectively compensate for the phenomena of alteration of the spectrum of the output pulses.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
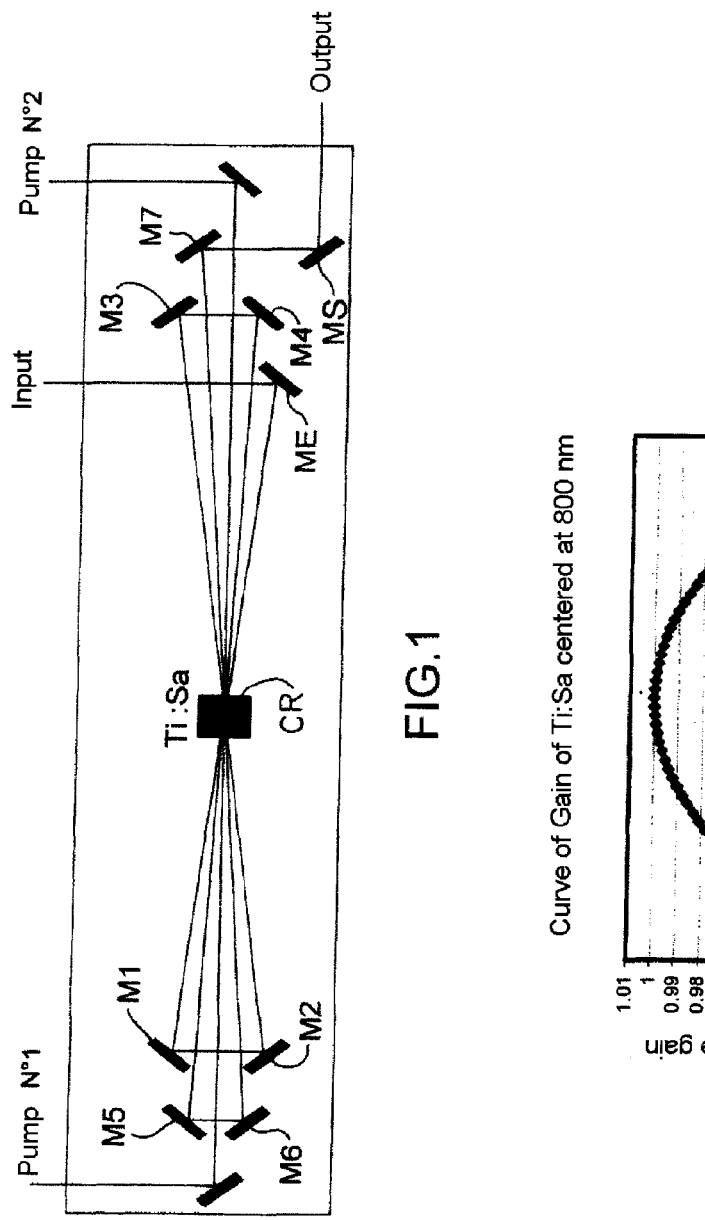
FIG. 1, already described above, is a simplified diagram of a multi-pass amplifier stage of a CPA chain, FIGS. 2 to 5, already mentioned above, are various gain curves highlighting problems encountered in conventional CPA chains, FIG. 6, already mentioned above, is a simplified diagram of a conventional CPA chain, FIG. 7, already mentioned above, is a chart of a exemplary curve of the evolution of the spectrum of a Ti:Sa oscillator and of its spectral phase, FIG. 8, already mentioned above, is a simplified diagram indicating the parts of a pulse signal acted on by an amplifier of a CPA chain, FIGS. 9 to 12, already mentioned above, are various gain curves highlighting problems encountered in conventional CPA chains.
Figure 2:
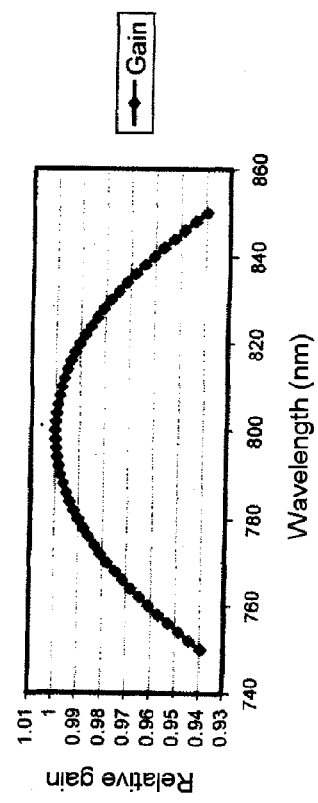
Figure 3:
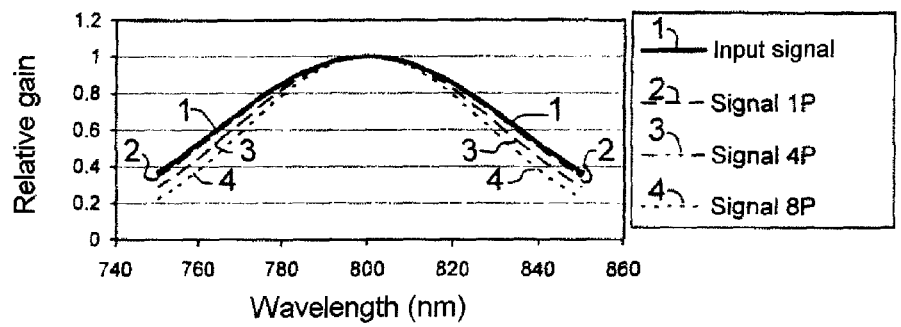
Figure 4:
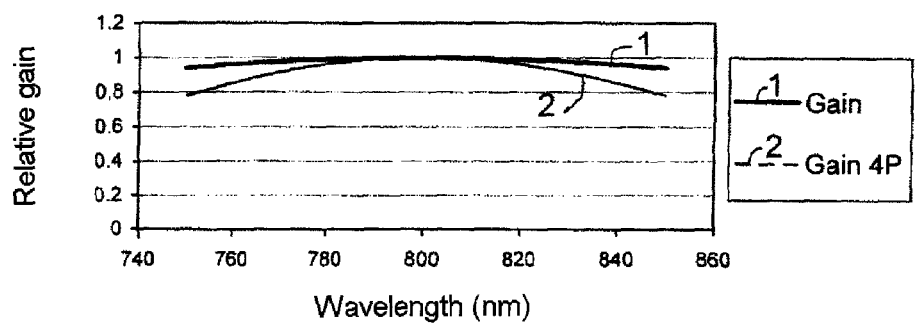
Figure 5:
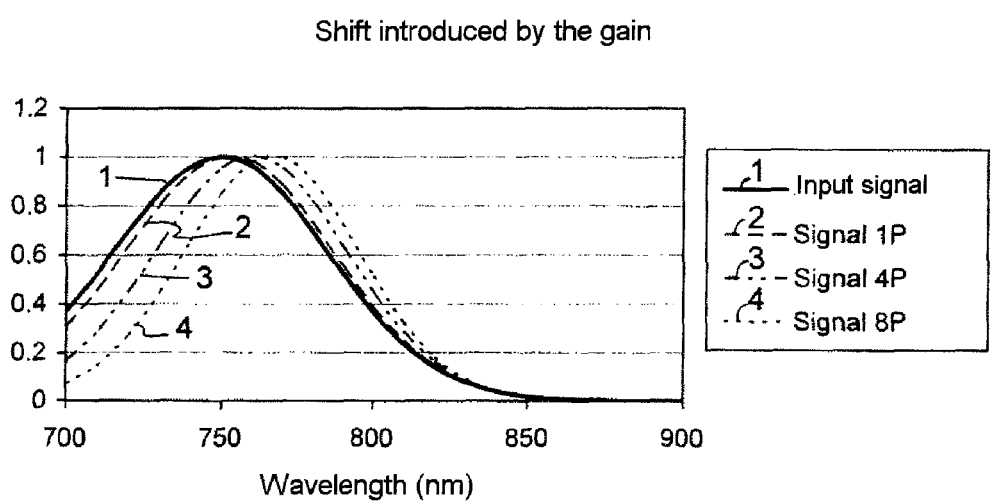
Figure 6:
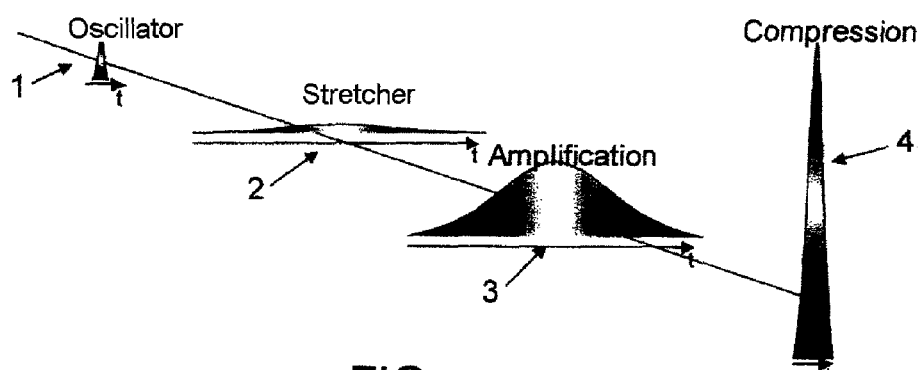
Figure 7:
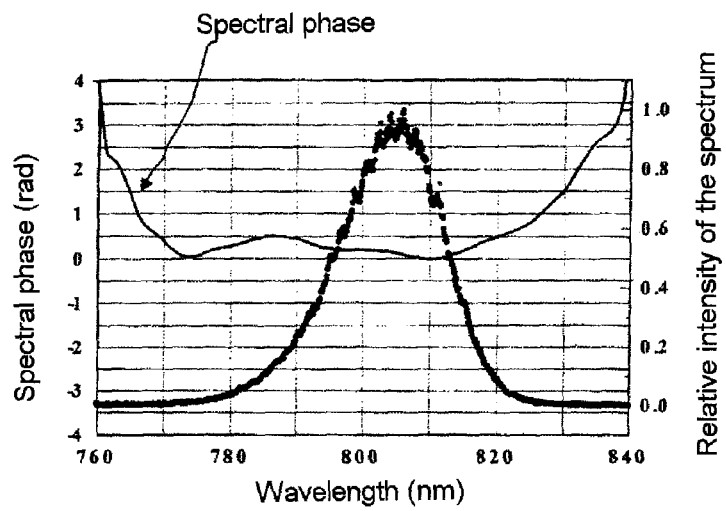
Figure 8:
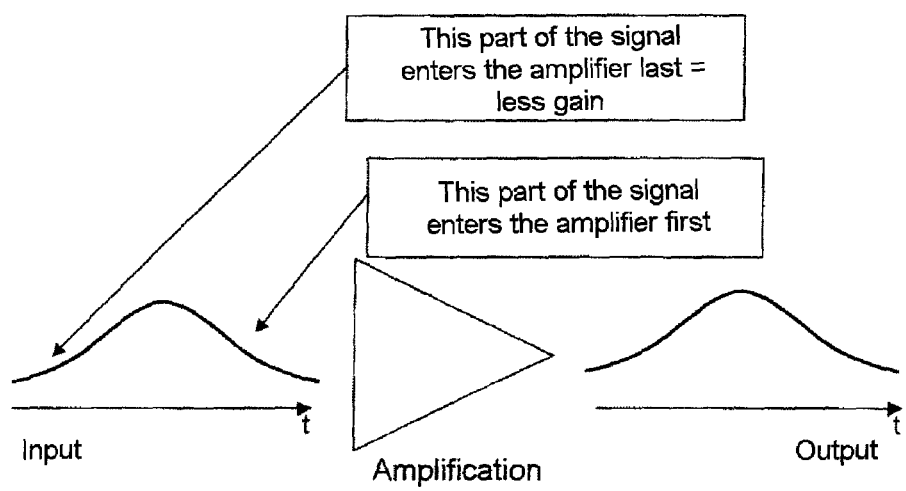
Figure 9:
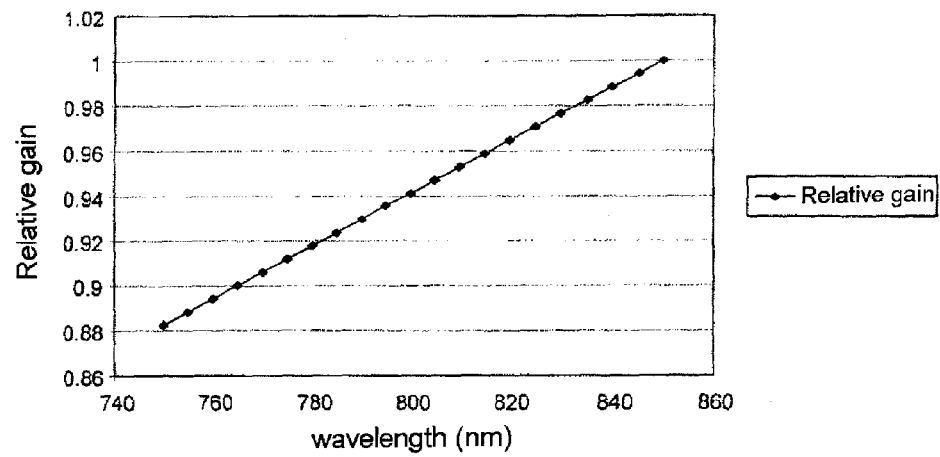
Figure 10:
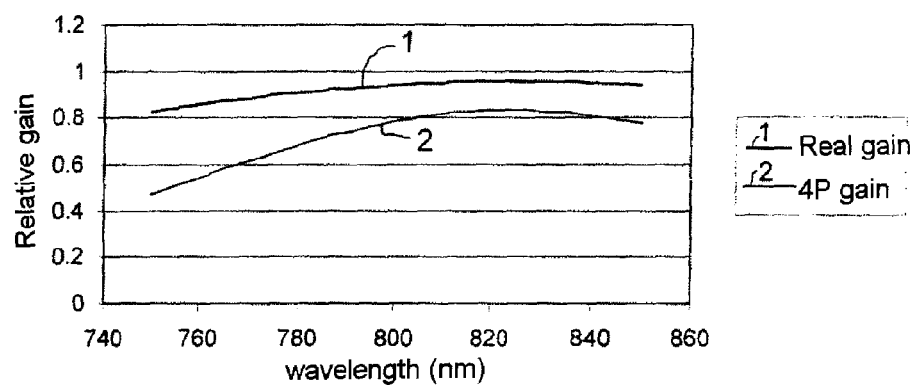
Figure 11:
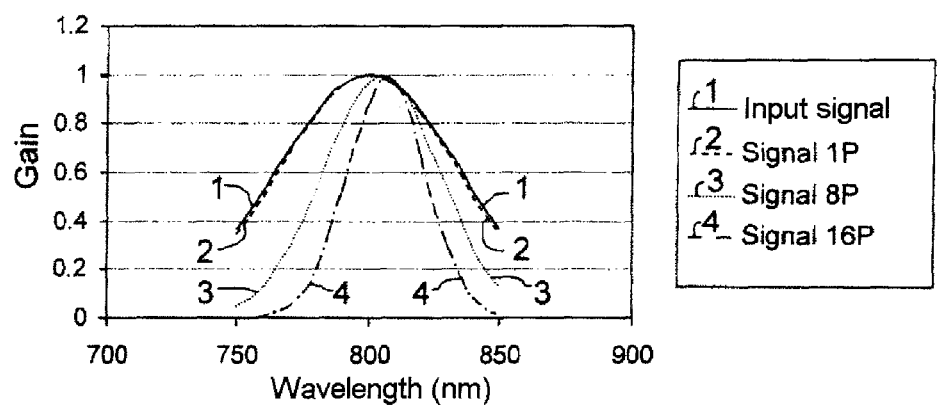
Figure 12:
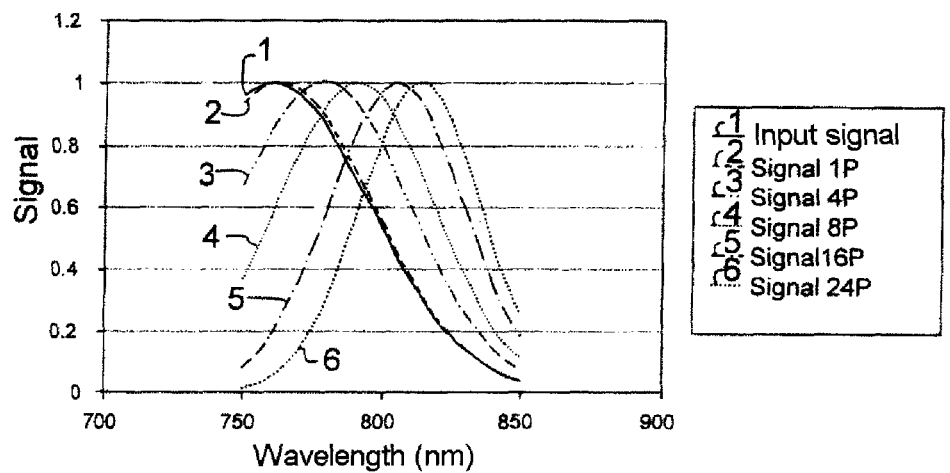
Figure 13:
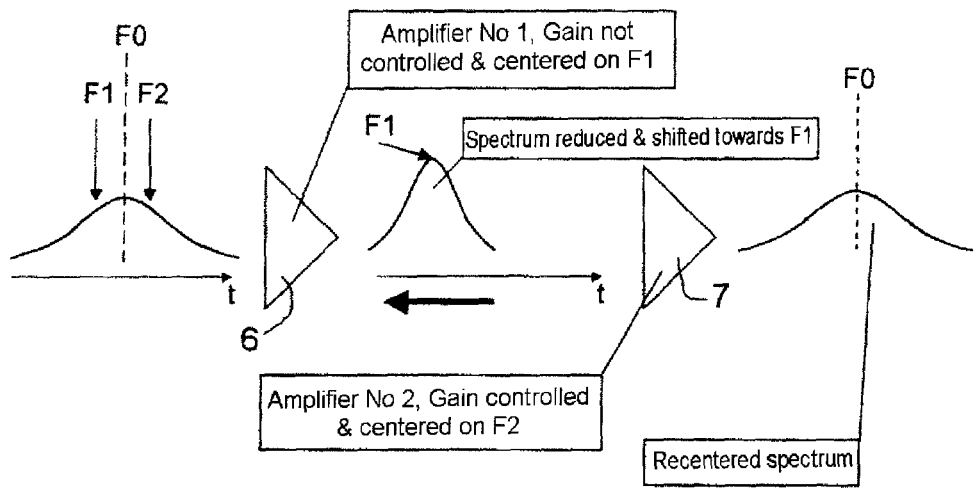
FIG. 13 is a diagram of a CPA chain with two amplifier stages in accordance with the invention and showing how the method of the invention is applied.

The invention is applicable to a system furnished with at least two amplification stages. It consists in carrying out on one of the stages a shift of the centering of the gain curve via control of the temperature of the crystal of this amplifier stage. Shown diagrammatically in FIG. 13 is an example of such an implementation on two successive amplification stages 6, 7 receiving a stretched pulse centered on F0. The stage 6 is not temperature-controlled, its gain curve is shifted and centered on a frequency F1 of less than F0 (towards the blue).

The stage 7 is cooled in accordance with the invention and its gain curve is centered on F2, greater than F0. As a result, at the output of the stage 7 the pulse is recentered on F0.

For example, when a crystal of Ti:Sa is cooled to low temperature (20 to 150 K, and typically to about 77 K), a shift of the gain maximum towards the lower wavelengths is observed.

The temperature-controlled spectral shift is applied in opposition to the temporal dispersion of the pulse, therefore in opposition to the phenomenon of shifting towards the higher wavelengths as described above with reference to the prior art.

The aggregation of the successive amplifications of the two gain curves makes it possible to obtain an amplification configuration which avoids spectral constriction, and therefore preserves the short pulse duration.

Figure 14:
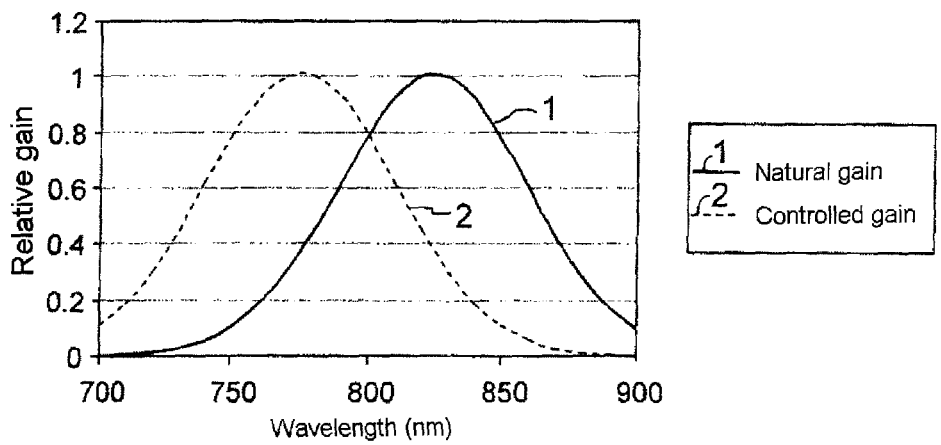
FIGS. 14 and 15 are gain curves highlighting the effects of the method of the invention.
Figure 15:
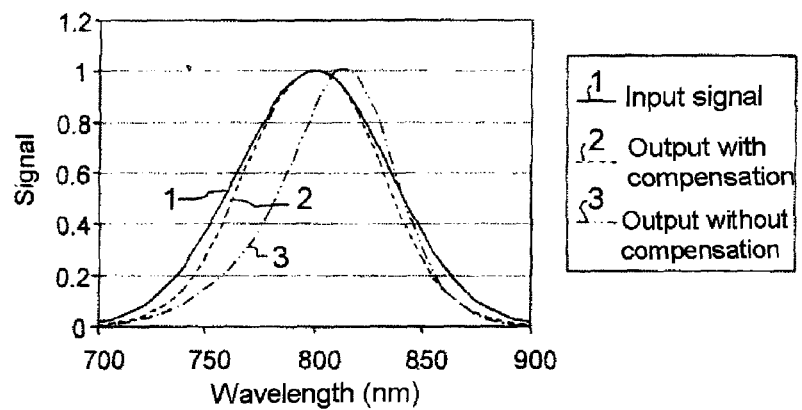

According to an exemplary embodiment of the invention, two cascaded Ti:Sa amplification stages are considered. The first stage is an amplifier in "natural" mode and a shift of the gain towards large wavelengths is therefore observed. The second stage is strictly identical to the previous, except that the amplifier crystal is cooled to about 77K, the effect of this being to shift the centering of the gain curve towards shorter wavelengths, as represented in FIG. 14. The total gain of the chain is therefore the aggregate of the two gains of the two stages. The graph of FIG. 15 clearly shows the difference of the effects with and without the compensation system of the device of the invention.

When the two amplifiers are identical, the output signal exhibits a reduced spectrum shifted towards the high wavelengths (curve 3). When the device is used on a stage, the centering of the spectrum is maintained and the constriction is practically avoided (curve 2).

The method of the invention does not act by filtering, there is therefore no energy-related impact and preserves the efficiency of the amplifiers.

The temperature control can be carried out by any appropriate cooling system: Peltier-effect device, liquid-cooled device, cryogenic finger etc.

The method of the invention is applicable to any laser material, and for example titanium-doped sapphire, for which a temperature variation modifies the central position of the gain curve.

In an architecture with several amplification stages, the system is advantageously disposed on the amplifier dissipating the least energy, thereby reducing the dimensioning of the temperature control system.

In an architecture with several amplification stages, the cooling device is advantageously disposed on the amplifier operating in a regime closest to saturation, so as to limit the spectral effects of the saturation.

Figure 16:
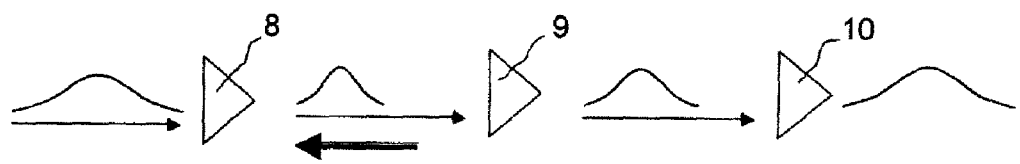
FIG. 16 is a diagram of a CPA chain with three amplification stages in accordance with the invention.

The diagram of FIG. 16 illustrates by way of example an architecture with three amplification stages (8 to 10), the first (8) being furnished with the spectral control device which compensates for the shift effects produced by the subsequent two stages.

In an advantageous manner, the cooling is slaved so as to maximize the spectrum of the output pulses. This slaving is carried out by a spectral measurement at the output of the amplifiers and a feedback to the cooled stage(s).

In conclusion, the invention makes it possible to compensate for spectral constriction in frequency-drift chains (CPA) handling in particular ultra-short pulses (for example with a duration of the order of a few fs). It makes it possible to attain the shortest durations while maintaining a wide spectrum during the amplification phases, doing so without altering the efficiency of the laser. Indeed, the invention does not act by subtractive filtering, but shifts the gain curves without decreasing the energy of the pulses. It is therefore an economic alternative to filters and its effects are adjustable via temperature control.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of spectral control in a frequency-drift laser chain for producing ultra-short pulses and comprising at least two laser-crystal amplifier stages, the method comprising:
   cooling the laser crystal of at least one of the amplifier stages of the chain;
   producing a pulse from an oscillator;
   stretching the pulse;
   amplifying the pulse with the at least two amplifier stages; and
   compressing the amplified pulses.

2. The method as claimed in claim 1, wherein the crystal is cooled to a temperature range from 20° K to 150° K.

3. The method as claimed in claim 1, wherein the crystal of the amplifier dissipating the least heat energy is cooled.

4. The method as claimed in claim 1, wherein the crystal of the amplifier operating in a regime closest to saturation is cooled.

5. The method as claimed in claim 1, wherein the cooling is slaved so as to maximize a width of the spectrum of the output pulses.

6. The method of claim 1 wherein, the temperature of the cooled crystal is adjusted in order adjust the peak wavelength of the amplified pulses.

7. A Chirped Pulse Amplification (CPA) chain comprising:
   an oscillator for producing pulses;
   a stretcher for stretching the pulses;
   at least two amplifier stages for amplifying the stretched pulses;
   a cooling device associated with the crystal of one at least of the amplifier stages;
   a compressor for compressing the amplified pulses.

8. The device as claimed in claim 7, wherein the laser crystal is formed of a titanium-doped sapphire material.

9. A CPA-chain pulse laser, comprising the device of claim 7.

10. The device as claimed in claim 7, wherein the cooling device is one of the following devices: liquid-cooled device and cryogenic finger.

11. The CPA chain of claim 7 further comprising, a temperature controller configured to adjust the temperature of the cooled crystal in order to adjust the peak wavelength of the amplified pulses.

* * * * *